May 21, 1935. R. W. COOK 2,001,835
SPRING CONNECTER
Filed Nov. 26, 1934
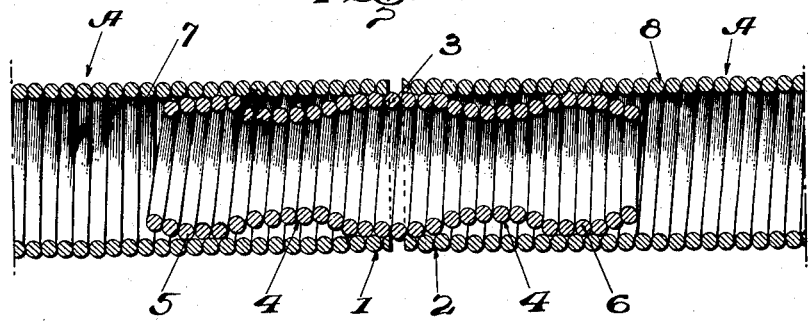
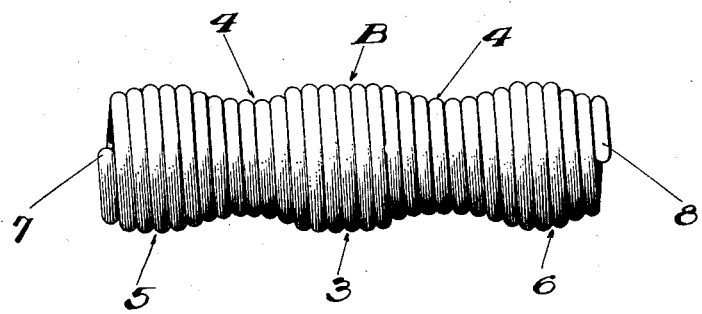
Inventor
Raymond W. Cook
By Samuel Scrivener Jr.
Attorn Patented May 21, 1935

2,001,835

UNITED STATES PATENT OFFICE 2,001,835

SPRING CONNECTER

Raymond W. Cook, Bristol, Conn., assignor to Wallace Barnes Company, Bristol, Conn., a corporation of Connecticut Application November 26, 1934, Serial No. 754,903

8 Claims. (Cl. 267—1)

This invention relates to spring devices and, more particularly, to devices for connecting the two ends of a spring coil in order to form an endless belt.

It has heretofore been proposed to connect the ends of a spring coil, in order to form an endless belt, by means of a short length of a spring coil having an outside diameter equal to the inside diameter of the coil to be formed into an endless belt but, until the present invention, no entirely satisfactory connecting coil of the type has been provided for this purpose.

The present invention, therefore, has for its object the provision of an improved and novel device in the form of a spring coil for the purpose of connecting the ends of a spring coil in an improved manner.

Another object of the invention is to provide a connecting device of the character described comprising a plurality of separated portions engaging the inner surface of the convolutions of a spring coil.

Another object is to provide a connecting coil of the character described comprising a central enlarged portion engaging the end portions of the spring coil and a plurality of other enlarged portions engaging portions of the spring coil spaced from the ends thereof.

A further object is to provide a connecting coil of the character described which will be so constructed as to provide a completely resilient connection between the ends of a spring coil whereby improved operation of the spring coil as an endless belt will be provided.

Other objects and features of novelty will be apparent from the following description and the annexed drawing, it being expressly understood that the invention is in no way limited by such description and drawing or otherwise than by the appended claims.

Referring to the drawing, in which similar reference numerals refer to like parts, Fig. 1 is a view, partly in section, showing the connecter according to the present invention in operative relation to the ends of a spring coil, and Fig. 2 is a view of a connecting device according to the present invention.

Referring to the drawing and particularly to Fig. 1 thereof, there are disclosed therein the ends 1, 2 of a spring coil A, such ends being brought into juxtaposition or abutment, as shown, for the purpose of attaching them together in order to form the spring coil A into an endless belt. It will be apparent that the ends of coil A must be so connected as to perfectly align the outer surfaces thereof, and further, the means for connecting these ends should be such as not to impair in any way the resiliency or flexibility of the coil, it being apparent that a rigid or stiff connecting means in the endless belt will materially affect the operation of the same as a power-transmitting means.

Means are provided by the present invention for connecting the ends of the spring coil in such a manner as to provide perfect alignment of the outer surfaces of the ends of the spring coil, a completely resilient connection therebetween, and a sure and firm connection which will hold the ends together under all conditions of use. Such means comprise the connecting device B disclosed clearly in Fig. 2 and it will be seen that such device comprises a short length of helically coiled wire forming, in effect, a short spring coil. In accordance with the present invention the connecter comprises a plurality of portions having outside diameters of such dimensions that these portions may be fitted to the inner surface of the convolutions of the spring coil A, by such means as interthreading the convolutions of the spring coil with those of the said portions, such portions being separated by portions having reduced diameter. As disclosed in the annexed drawing, the connecter B is so formed as to provide, midway of its longitudinal length, a plurality of convolutions of relatively larger diameter, these being clearly disclosed at 3 in the drawing and forming a central, enlarged series of convolutions having such an outer diameter that these convolutions may be fitted to the inner surface of the convolutions of the spring coil A. Adjacent each of the outer ends of the series of convolutions 3, the spring connecter B is so formed as to provide a series of convolutions 4 each of these series having an outer diameter materially smaller than that of the convolutions 3. It will be apparent that the smaller series of convolutions 4 may taper from the diameter of portion 3 down to any desired diameter or, if desired, the change from the larger to the smaller diameter may be made abruptly, in which latter case the smaller convolutions 4 will all have the same outer diameter.

The reduced-diameter portions 4 of the spring connecter are continued for a short distance toward each end of the spring connecter and the outer diameters of the convolutions of the spring connecter are then increased toward each end of the connecting device to provide two enlarged portions 5, 6 having outer diameters equal to that of the central enlarged portion 3, and, therefore, capable of being fitted to the inner diameter of the convolutions of spring coil A. The enlarged portions 5, 6 may be made to extend along the longitudinal length of the connecter for any desired distance, or for any desired number of convolutions. From the outer ends of these enlarged portions the convolutions of the spring connecter are preferably made of progressively decreased outside diameter, as at 7, 8, until any desired outside diameter is reached at the ends of the connecter.

It will thus be apparent that a spring connecter has been provided comprising a spring coil having a central enlarged portion and other enlarged portions intermediate the central enlarged portion and the ends of the coil, each of such enlarged portions comprising convolutions of equal outer diameter, such outside diameter being such that these enlarged portions may be fitted to the inner surface of the spring coil which is to be formed into an endless belt. These three enlarged portions are, in the preferred form of the invention, separated by portions of the spring coil having a diameter materially smaller than that of the enlarged portions.

In the operation and use of the described device, if it is desired to connect the ends 1, 2 of the spring coil A, the connecting device B may be threaded into one end of the spring coil until one-half of the connecter is disposed within the spring coil, the convolutions of the spring coil and the connecter acting as threads for tightly and firmly connecting the two members. The other end of the spring coil A may then be attached to the exposed end of the connecter by interthreading the convolutions of the two elements, all as clearly disclosed in Fig. 1 of the drawing.

It will be seen that each end of the spring coil A is attached to the connecting device by the inter-threading of the convolutions thereof with the convolutions of one of the outer enlarged portions 5, 6 and with one-half of the convolutions of the central enlarged portion 4, thereby firmly connecting each of the ends of the spring coil to the connecting device.

It will also be apparent that the reduced diameter portions 4 of the connecting device will provide portions of greater resiliency intermediate the enlarged attaching portions, whereby increased resiliency of the connecter is obtained. In this manner the rigidity of the connecting means is reduced, providing for better operation of the endless belt as a power-transmitting means. Further, the tapered and reduced ends of the connecting device permit the circular configuration of the endless belt to be attained without interference from the connecter. Due to the combination of a plurality of enlarged, attaching portions with a plurality of reduced-diameter portions and the tapered end portions, the advantages of connecting devices of this general type are greatly increased.

While I have described and disclosed one embodiment of my invention, it will be apparent to those skilled in the art that further modifications and improvements may be made without departing in any way from the scope of the invention, for the limits of which reference must be had to the appended claims.

What is claimed is:

1. In combination, a spring coil, and means for connecting the ends of said spring coil, such means comprising a connecting device having a plurality of spaced portions engaging the convolutions of said spring coil, and a plurality of spaced portions spaced from the inner surface of said spring coil and of greater flexibility than said first-named spaced portions.

2. In combination, a spring coil, and means for connecting the ends of said spring coil, said means comprising a connecting device having a plurality of spaced portions each of which engages a plurality of convolutions of said spring coil, and a plurality of spaced portions connecting said engaging portions and being of smaller diameter than said engaging portions.

3. In combination, a spring coil, and means for connecting the ends of said spring coil, said means comprising a connecting device having a plurality of spaced portions the outer surfaces of which are engaged with the inner surfaces of the convolutions of said spring coil, each of said spaced portions being of such a length that it will engage a plurality of convolutions of the spring coil, and other portions connecting said first-named portions and having a smaller diameter than said first-named portions.

4. A connecter for the ends of a spring coil, comprising a spring coil having a plurality of spaced portions of such diameter that they may be fitted to the inner surfaces of the convolutions of the spring coil, and a plurality of portions connecting said spaced portions and having smaller diameters and greater flexibility than said spaced portions.

5. A connecter for the ends of a spring coil, comprising a spring coil having a plurality of spaced portions of such diameter that they may be fitted to the inner surfaces of the convolutions of the ends of the spring coil, and connecting portions between said spaced portions having smaller diameters than said spaced portions and each comprising a plurality of convolutions.

6. A connecting device for the ends of a spring coil, comprising a spring coil having a plurality of spaced portions each comprising a plurality of convolutions and being of such diameter that they may be interfitted with the inner surfaces of the convolutions of the ends of the spring coil, and connecting portions between said spaced portions and having smaller diameters than said spaced portions and each comprising a plurality of convolutions.

7. A connecter for the ends of a spring coil, comprising a helically wound coil having a central portion having such an outside diameter that said central portion may be fitted to the inner surface of said spring coil, a reduced diameter portion of greater flexibility than said central portion adjacent each end of said central portion, other portions disposed adjacent said reduced portions and having outside diameters equal to the outside diameter of said central portion, and tapered end portions adjacent each of said other enlarged portions.

8. A connecter for the ends of a spring coil, comprising an elongated member having a central portion of such diameter that it may be engaged with the inner surfaces of the ends of the spring coil and of such length that it will engage a plurality of convolutions of each end of the spring coil, a reduced diameter portion adjacent each end of said central portion, other portions disposed adjacent the ends of said reduced portions and having outside diameters equal to that of said central portion, and tapered end portions adjacent each of said other portions.

RAYMOND W. COOK.